July 16, 1946.  T. O. BRANDON  2,403,965

STADIMETER

Filed Oct. 30, 1943

WITNESSES:
W. Naecker.

INVENTOR.
THOMAS O. BRANDON

BY
ATTORNEY.

Patented July 16, 1946

2,403,965

UNITED STATES PATENT OFFICE 2,403,965

STADIMETER

Thomas O. Brandon, United States Navy

Application October 30, 1943, Serial No. 508,311

1 Claim. (Cl. 88—2.4)

(Granted under the act of March 3, 1883, as amended April 30, 1928; 370 O. G. 757)

My invention relates to optical devices for measuring distances, and in particular to such devices classified as stadimeters.

One of the most useful devices aboard ship is the stadimeter, by which means the distance of an object is quickly indicated if a dimension such as its height is known, or by which its dimension is indicated if its distance is known.

It is a primary object of my invention to provide a stadimeter of simplified and more sturdy construction and in which the manufacturing and maintenance costs are materially reduced.

It is another main object of my invention to provide a stadimeter wherein the device which carries the distance indicating drum is carried by a support pivotally attached to the main frame, and bears resiliently against the index bar which is also pivotally attached to the main frame and carries the index mirror.

These, and other objects will become apparent as the description progresses, and from the drawing, wherein.

Figure 1:
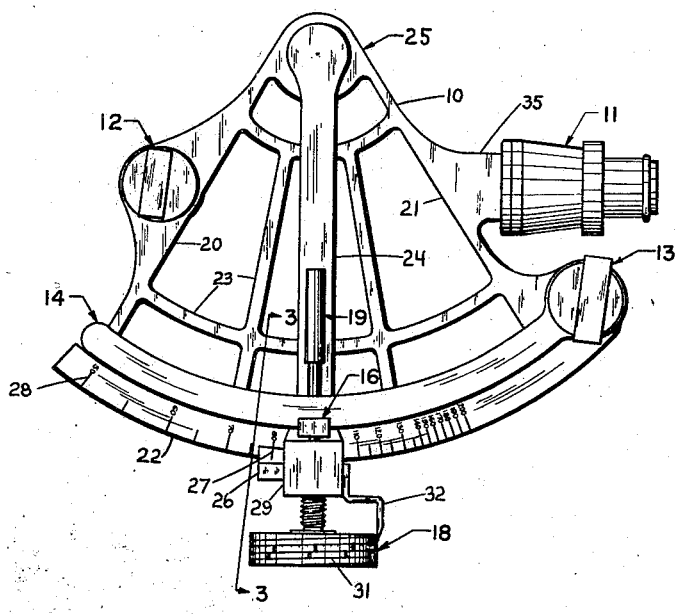
Fig. 1 is a side elevational view of the stadimeter.

As shown in the drawing a three-sided main frame 10 has two straight sides 20 and 21 meeting at an apex 25 opposite to its third side 22 which is a circular arc. Web members 23 extend between the sides of the main frame.

Figure 3:
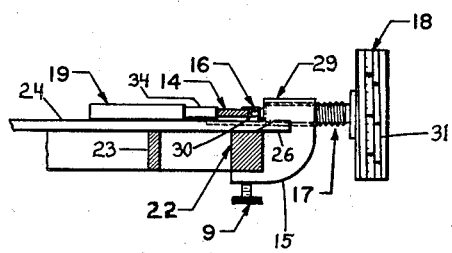
Fig. 3 is a sectional view along the line 3—3 of Fig. 1 looking in the direction of the arrows.

An arm 24 extends from the apex 25 of the frame to beyond the circular side 22, and is pivoted at one end in a bearing (not shown) at the apex 25, so that the arm swings about the center of the arc of the circular side 22. At the outer end of arm 24 is a lug 15 (Fig. 3) which may be either integral with arm 24 or fastened to it by means not shown. As shown in Fig. 3 the lug 15 has a downwardly extending flange which extends under the circular side 22 of the main frame 10. A clamp screw 9 is threaded into this flange, and when tightened it clamps the arm 24 to the circular side 22 at any desired position along its arc.

Lug 15 also has a projection 26 shown in Figs. 1 and 3 which has a portion overlying the circular side 22. Projection 26 has a scratch line 27 drawn radially to the center of the arc of side 22 to furnish an indicator to read the position of arm 24 along the side 22. The side 22 has graduations 28 inscribed on it as shown in Fig. 1, against which scratch line 27 is read.

Also forming a part of lug 15 is an upwardly extending boss 29 (Fig. 3) which is drilled and tapped to receive a drum screw 17. A drum 18 is fixed to the outer end of screw 17. The inner end of screw 17 is conical but terminates in a ball portion 30 which is received and held by a spherical socket in a sliding angled member 16. Member 16 has a flat bottom portion which slides radially along arm 24 as screw 17 is rotated by means of the drum 18. A helical scale 31 is inscribed on the periphery of the cylindrical surface of the drum 18 and is graduated in terms of distance. A pointer 32 is fixed to the boss 29 as shown in Fig. 1, and overlies the scale 31. In conjunction with the scale 31 the pointer 32 indicates the longitudinal and radial position of screw 17 in terms of the distance of the object the stadimeter is sighted on.

An index arm 14 has a circular curvature about the same center as the circular side 22, but with a smaller radius as shown in Fig. 1. The index arm 14 is pivotally mounted at one end in a bearing (not shown) in a boss 33 on the frame 10 near the juncture of sides 21 and 22, and is raised above the plane of the frame 10 to provide space for the arm 24.

Fixedly mounted on the arm 24 is a tube 19 enclosing a coil spring (not shown) and guiding a plunger 34 which telescopes into tube 19 and against the spring. Plunger 34 is thereby resiliently urged outwardly. The index arm 14 is thereby constantly and resiliently held against the angled slide member 16 on the drum screw 17. Thus when slide member 16 is moved inwardly or outwardly by rotation of the drum 18 and screw 17, the index arm 14 is rotated about its pivot in the boss 33. Since the tangent to index arm 14 will not always be normal to the drum screw 17, as it is when in the position shown in Fig. 1, the universal connection between the ball 30 and member 16 provides for proper alignment of member 16 with the index arm 14.

Figure 2:
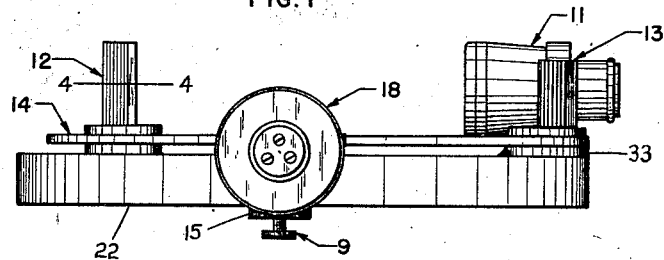
Fig. 2 is a bottom view of the device.

A horizon mirror 12 is fixed to the frame 10 on the side 20, and any common means (not shown) may be included to provide for adjustment of the mirror in its mounting. Only half of mirror 12 is silvered; as shown in Fig. 2 the portion above line 4—4 being clear or translucent glass, and the portion below line 4—4 being silvered on the side toward the eyepiece 11. An index mirror 13 is similarly fixed to the index arm 14 at its pivoted end. Mirror 13 is silvered over its entire surface on the side facing mirror 12.

An extension 35 on the frame 10 provides a mounting for a telescopic eyepiece 11 which is in alignment with mirror 12.

In operation, assuming that the dimension of an object, such as the height of a ship, is known, clamp screw 9 is loosened and the arm 24 is moved about its pivot until the scratch line 27 coincides with the graduation 28 on the arcuate side 22 that corresponds to the known dimension. Screw 9 is tightened. Then the instrument is held so that the ship is seen through the eyepiece 11 and the unsilvered portion of mirror 12. The drum 18 is then rotated until the image of the ship's masthead, reflected from the mirror 13 and then from the silvered portion of mirror 12, coincides with the ship's waterline as seen directly through the unsilvered portion of the mirror 12. If the length of the ship is known instead of its height, then the instrument will be held in the position shown in Fig. 2 and its distance found by setting arms 24 and 14 in a manner similar to that described above, and the bow and stern will be made to coincide in the clear and silvered portions of mirror 12.

The invention described herein may be manufactured and used by or for the Government of the United States of America for governmental purposes without the payment of any royalties thereon or therefor.

I claim:

In a stadimeter, a main frame having a circular arcuate side; a horizon mirror mounted in relatively fixed position on said frame; an eyepiece fixed to said frame in alignment with and spaced from said horizon mirror; a curved index arm mounted on said frame for pivotal movement about an axis adjacent one end of said arcuate side, said index arm being adjacent to said arcuate side and substantially concentric with said arcuate side when in operating position; an index mirror mounted on said index arm substantially at its pivotal mounting; a second arm mounted on said frame for pivotal movement about an axis coinciding with the center of said arcuate side, the other end of said arm slidably engaging said arcuate side; clamping means to fix said second arm against rotation; screw means mounted for radial movement on said second arm to rotate said index arm about its pivot; a slide member universally connected to said screw means and engaging the lower edge of said index arm; a spring-biased member on said second arm opposed to the slide member to urge the index arm resiliently against the slide member; and scale means to indicate the positions of said arms with respect to said frame, including graduations on said arcuate side, a graduated drum on the outer end of said screw means, and indicating means on said second arm.

THOMAS O. BRANDON.